United States Patent
Colting

(10) Patent No.: US 7,552,893 B2
(45) Date of Patent: Jun. 30, 2009

(54) AIRSHIP & METHOD OF OPERATION

(75) Inventor: Hokan S. Colting, Newmarket (CA)

(73) Assignee: 21st Century Airship Technologies Inc., Newmarket (CA)

( * ) Notice: Subject to any disclaimer, the term of this patent is extended or adjusted under 35 U.S.C. 154(b) by 148 days.

(21) Appl. No.: 11/236,569

(22) Filed: Sep. 28, 2005

(65) Prior Publication Data

US 2007/0069077 A1    Mar. 29, 2007

(51) Int. Cl.
   B64B 1/58    (2006.01)
   B64B 1/02    (2006.01)

(52) U.S. Cl. .................... 244/30; 244/128

(58) Field of Classification Search ............. 244/128
   See application file for complete search history.

(56) References Cited

U.S. PATENT DOCUMENTS

| | | | | |
|---|---|---|---|---|
| 1,682,405 | A * | 8/1928 | Naatz | 244/30 |
| 2,396,494 | A | 3/1946 | Donnell et al. | |
| 3,180,590 | A * | 4/1965 | Fitzpatrick | 244/30 |
| 3,613,932 | A * | 10/1971 | Yamamoto | 220/560.07 |
| 3,620,485 | A | 11/1971 | Gelhard | |
| 3,844,507 | A * | 10/1974 | Papst | 244/30 |
| 3,972,492 | A | 8/1976 | Milne | |
| 4,032,085 | A * | 6/1977 | Papst | 244/30 |
| 4,085,912 | A | 4/1978 | Slater | |
| 4,711,416 | A * | 12/1987 | Regipa | 244/31 |
| 4,773,617 | A * | 9/1988 | McCampbell | 244/24 |
| 4,865,266 | A * | 9/1989 | George | 244/31 |
| 5,285,986 | A * | 2/1994 | Hagenlocher | 244/97 |
| 5,294,076 | A | 3/1994 | Colting | |
| 5,333,817 | A * | 8/1994 | Kalisz et al. | 244/97 |
| 5,348,251 | A * | 9/1994 | Ferguson | 244/30 |
| 5,538,203 | A * | 7/1996 | Mellady | 244/97 |
| 5,645,248 | A | 7/1997 | Campbell | |
| 5,755,402 | A * | 5/1998 | Henry | 244/29 |
| 5,890,676 | A | 4/1999 | Coleman et al. | |
| 5,992,795 | A * | 11/1999 | Tockert | 244/31 |
| 6,290,176 | B1 * | 9/2001 | Hankinson et al. | 244/125 |
| 6,427,943 | B2 | 8/2002 | Yokomaku et al. | |
| 6,698,686 | B2 | 3/2004 | Ogawa et al. | |
| 6,708,922 | B1 | 3/2004 | Hamilton | |
| 6,739,549 | B2 * | 5/2004 | Senepart | 244/24 |
| 6,966,523 | B2 * | 11/2005 | Colting | 244/30 |
| 7,055,777 | B2 * | 6/2006 | Colting | 244/30 |
| 7,156,342 | B2 * | 1/2007 | Heaven et al. | 244/30 |
| 2003/0234320 | A1 | 12/2003 | Colting | |
| 2006/0065777 | A1 | 3/2006 | Walden et al. | |

FOREIGN PATENT DOCUMENTS

CA    2172269    9/1999

* cited by examiner

*Primary Examiner*—Michael R Mansen
*Assistant Examiner*—Joseph W Sanderson
(74) *Attorney, Agent, or Firm*—John R. S. Orange; Blake, Cassels & Graydon LLP

(57) ABSTRACT

This invention relates to the field of buoyant aircraft and operation thereof, in particular, airships with improved stability. The present invention is directed to non-rigid, non-spherical airships having an envelop contained within the airship and at least one further envelop contained therein for holding a volume of lifting gas.

6 Claims, 6 Drawing Sheets

AIRSHIP & METHOD OF OPERATION

FIELD OF THE INVENTION

This invention relates to the field of buoyant aircraft and operation thereof, in particular, airships with improved stability.

BACKGROUND OF THE INVENTION

The use of airships as high altitude platforms for a number of applications has long been contemplated. It has been suggested that airships could provide suitable platforms for communication and surveillance purposes or for environmental applications (e.g. monitoring of pollution or the ozone layer). Traditional airships, whether non-rigid airships or those having a rigid internal frame or skeleton, can be more suitable for use at low altitudes than at high altitudes.

In one common form of an airship, a gondola which may house crew, equipment, etc., is suspended under an elongate generally ellipsoidal or cigar shaped envelope filled with lighter-than-air or lifting gas, such as, for example, hydrogen or helium. Such traditional cigar-shaped airships are typically not used at altitudes above approximately 5,000 feet or approximately 1.5 kilometers (Km) above mean sea level. Such airships are typically used for advertising, relaying broadcasts of events, monitoring, security guarding, transporting, sightseeing, etc. at low altitudes (approximately 1 kilometer or less above mean sea level) where there is a relatively small change in atmospheric pressure. For airships used at such low altitudes, the flight altitude control is relatively easy because the flight altitude does not have to be changed over a wide range. Specifically, for such an airship, the volume of the envelope containing the lighter-than-air or lifting gas is determined so that it can withstand flight at the maximum altitude. A traditional cigar-shaped airship ascends by gaining speed from its propulsion apparatus, such as, for example, engines or propellers and then using the elevators, located at the rear of the. horizontal fins, to give the airship a positive or nose-up pitch. If the airship is equipped with vectoring engines/propellers it can also ascend by the vectored thrust.

Unlike rigid airships which have an internal framework, non-rigid airships maintain their shape solely through pressure exerted on the interior surface of an envelope by the fluids (e.g. lifting gas and/or air) contained within the envelope. This pressure is exerted through a combination of lifting gas contained within the envelope and air contained within interior envelopes, or ballonets, mounted within the envelope. Conventionally, cigar-shaped airships have one or more ballonets of variable volume mounted within the envelope. Ballonets are structures contained within the envelope of the airship and are adapted to receive air from the exterior of the airship. They also act to maintain the pressure exerted on the interior surface of the envelopes so as to maintain the shape of the airship. The volume of air contained within each ballonet can be adjusted by inflating or deflating the ballonet. In this way, the pressure exerted on the interior surface of the envelope can be controlled, as changes to the volume of the ballonets compensates for changes in the volume of the lighter-than-air or lifting gas contained within the envelope that occur upon altitude changes. Furthermore, the pressure exerted on the interior surface of the envelope can be adjusted in accordance with the ambient pressure about the exterior surface of the airship so as to usually create and/or maintain a constant pressure differential between the internal pressure within the envelope and the external ambient pressure. This serves to maintain appropriate fluid (e.g. gas) pressure on the envelope and accordingly, the shape of the airship, preventing deformation or structural failure. This pressure differential is typically regulated or maintained automatically through blowers that are designed to provide a specific pressure and through valves that open when the pressure exceeds a predetermined limit.

In order for an airship to ascend to altitudes of between about 60,000 ft. to 70,000 ft., typically referred to as the "stratosphere" (e.g., approximately 18 to 21 Km), where the atmosphere density is approximately ⅑ to approximately ⅟₁₉ of that in the vicinity of the mean sea level, it is indispensable to provide an airship with a mechanism capable of adjusting to the varying volume (e.g. approximately 9 to approximately 19 fold) of the buoyant or lifting gas (e.g. helium, hydrogen, etc.). The interior or internal volume of the airship must therefore accommodate the expansion of the lifting gas that will occur as the airship gains altitude. For example, the ballonet operation between mean sea level (where ambient pressure is about 1013 mBar (MB)) and 5,000 ft (where ambient pressure is about 843 mBar (MB)) may involve ballonet(s) of approximately 20% of the interior or internal volume of the airship. In other words, when the ballonet(s) are close to being fully inflated, near mean sea level, they occupy approximately 20% of the internal or interior volume of the envelope of the airship. As the airship ascends from sea level, the lifting gas expands and the ballonet contracts. When the ballonet is empty the airship is at pressure altitude and can not ascend any higher without risking the rupture of the airship's envelope as a result of the increasing pressure of the lifting gas that now has nowhere to expand.

For a service ceiling of about 65,000 ft (where the ambient pressure is about 56 MB), the volume of the lifting gas used at lift-off from mean sea level may be as little as approximately ⅟₁₄ of the volume of the lifting gas at 65,000 ft. Therefore, at low altitude, the ballonets will tend to occupy a greater portion of the internal or interior volume of the airship and the lifting gas will occupy only a small portion of the internal or interior volume of the airship. This may present significant control challenges at low altitude, particularly for cigar shaped airships. This relatively small volume of lifting gas, which may occupy only about 6% of the volume of the airship at sea level, could be difficult to confine with traditional ballonets and, as a result, can shift within the envelope, affecting the airship's pitch (e.g. trim), yaw or rotation (collectively referred to as "attitude") and causing destabilization of the airship. As a result, traditionally designed cigar-shaped airships have been considered impractical for use at high altitude.

Attempts have been made to limit the destabilization that occurs in cigar-shaped airships, particularly airships designed for high altitude flight. Differential inflation of the ballonets can be used to adjust airship trim and thus maintain stability. In some cases, rather than mounting ballonets at the centre of the airship, ballonets are positioned in the front and rear sections of the hull. The supply or discharge of air to or from specific ballonets attempts to compensate for attitude instability of the airship as the lifting gas expands or shifts within the envelope.

Further attempts have been made to improve the efficiency of adjusting airship pitch (e.g. trim) and thus improve stability by positioning multiple ballonets along the entire length of the hull of the airship, to provide rapid attitude adjustment. For example, U.S. Pat. No. 6,698,686 to Ogawa et al. provides an airship in which the hull is divided vertically by bulkheads into a plurality of compartments that hold lifting gas in their upper sections and air in their lower sections. The bulkheads are formed of a meshed sheet in the upper sections and are provided with a plurality of vents to allow the lifting gas to move between respective upper compartments. When the lifting gas expands or moves between upper compartments to cause destabilization of the airship, air supply-and-discharge devices are used to alter the quantity of air in respective lower compartments to change the mass balance and thus stabilize the airship.

In a stratospheric airship described in U.S. Pat. No. 6,427,943 to Yokomaku et al., a diaphragm divides the interior of a high altitude airship into a buoyant gas compartment and an air compartment. The diaphragm is kept taut across a horizontal axis of the airship by a suspension cord connected to the upper and lower surfaces of the hull of the airship. This allows for smooth change in shape of the diaphragm as the buoyant gas expands or moves about, thus reducing the movement of the lifting gas that causes destabilization.

U.S. Pat. No. 5,294,076 as well as U.S. patent application Ser. Nos. 10/178,345 and 10/718,634, the content of which are incorporated herein by reference, provide examples of spherical airships directed to high altitude uses.

It would be advantageous to provide a generally elongated cigar shaped airship in which, for example, the shifting of lifting gas and resulting instability, was minimized.

SUMMARY OF THE INVENTION

An aspect of the present invention includes a non-rigid, non-spherical airship comprising a first envelope defining a hull having a first volume; a second envelope contained within the first volume and the second envelope defining a second volume; and a third envelope contained within the second volume and defining a third volume for holding a volume of lifting gas. A further aspect of the invention may include the above airship having a fourth envelope contained within the second volume of the second envelope.

A further aspect of the invention provides a method for operating an airship, the method comprising the steps of: providing a non-rigid, non-spherical airship having a weight and an outer envelope defining a hull having a first volume, said airship having a propulsion system and a directional control system, said airship also having a second envelope contained within the first volume and the second envelope having a second volume; and a third envelope contained within the second volume and having a third volume for holding lifting gas; inflating the third envelope with a volume of lifting gas wherein the volume of the lifting gas is sufficient to balance said weight and the volume of the lifting gas at mean sea level being less than $\frac{1}{19}$.sup.th of the third volume; and operating said airship to a location greater than 10,000 ft above mean sea level.

Yet a further aspect of the invention provides a ballonet for an airship comprising: a first envelope having a first volume; a second envelope contained within the first volume and having a second volume for holding a volume of lifting gas, the second envelope sized to accommodate an expansion of the volume of the lifting gas contained in the second envelope such that the volume of the second envelope expands as the volume of the lifting gas expands; and wherein a portion of the first volume not containing the second envelope decreases with the expansion of the second envelope while the sum of the portion of the first volume not containing the second envelop envelope and the volume of the second envelop envelope remains generally constant.

There is also included as an aspect of the present invention, an airship having the ballonet noted above.

Yet a further aspect of the invention is an airship capable of aerobatic flight.

BRIEF DESCRIPTION OF THE DRAWINGS

Various objects, features and attendant advantages of the present invention will become more fully appreciated and better understood when considered in conjunction with the accompanying drawings, in which like reference characters designate the same or similar parts throughout the several views.

DETAILED DESCRIPTION OF PREFERRED EMBODIMENTS

Figure 1A:
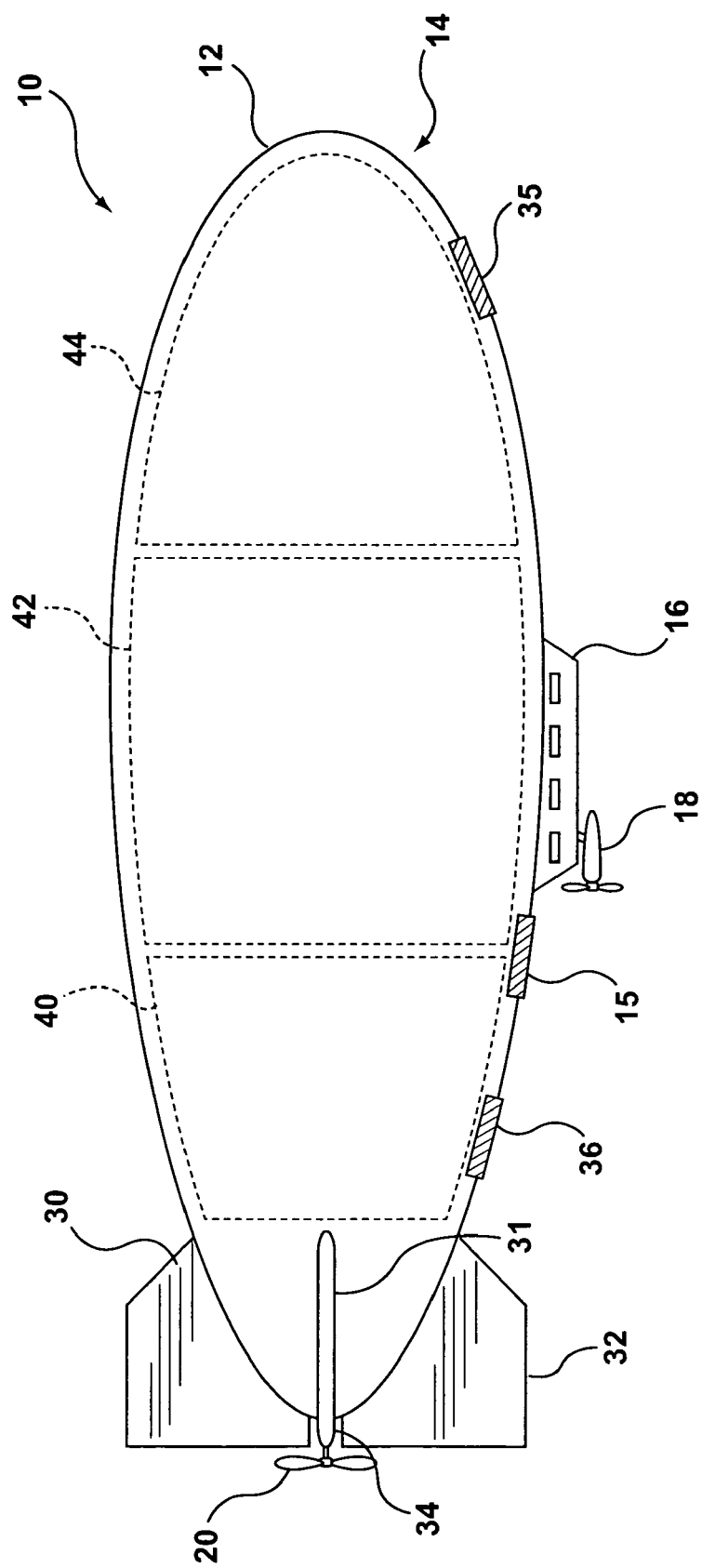
FIGS. 1(a) and (b) are side and bottom views of an embodiment of the present invention.

The description that follows, and the embodiments described therein, is provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

In order that the invention may be more fully understood, it will now be described, by way of example, with reference to the accompanying drawings in which FIG. 1 through FIG. 8 illustrate embodiments of the present invention.

In the description and drawings herein, and unless noted otherwise, the terms "vertical", "lateral" and "horizontal", are references to a Cartesian co-ordinate system in which the vertical direction generally extends in an "up and down" orientation from bottom to top (z-axis) while the lateral direction generally extends in a "left to right" or "side to side" orientation (y-axis). In addition, the horizontal direction extends in a "front to back" orientation and can extend in an orientation that may extend out from or into the page x-axis). Fore and aft (and leading and trailing) are terms having reference to the x-axis. The force of gravity, and hence buoyancy, acts parallel to the z-axis.

As used in the specification, there are also defined three axes of rotation with respect to airships based on the center of gravity of the aircraft. Typically, the orientation of an aircraft can be defined by the amount of rotation of the parts of the aircraft along these three axes. Each axis of this coordinate system is perpendicular to the other two axes. For example, the pitch axis is perpendicular to the yaw axis and the roll axis. A pitch motion or "pitch", also referred to as "trim", is an up or down movement of the nose and tail of the aircraft along the z-axis. A yaw motion or "yaw" is a movement of the nose of the aircraft from side to side along the y-axis. In other words, if an aircraft model placed on a flat surface is spun or pivoted around its center of mass, it would be described as yawing. A roll motion or "roll" is a rotational movement of an airship along the x-axis. If the aircraft is thought of as having a vertical, or z-axis, a longitudinal, or x-axis, and a transverse, or y-axis, pitch is rotation about the y-axis, roll is rotation about the x-axis, and yawing is rotation about the z-axis. When described together, the orientation of an aircraft is typically referred to as "attitude".

For the purposes of this description, it will be assumed that operating conditions are referenced to an ISA standard day, namely to a datum of atmospheric conditions at mean sea level on a 15° C. (59° F.) day.

In the embodiment of FIG. 1, a non-spherical elongate generally ellipsoidal or cigar shaped airship is indicated generally as 10. While airship 10 is generally elongated ellipsoidal or cigar shaped, it will be understood that non-spherical variations of this shape would be understood to work with the present invention, such as, for example, a generally egg shaped or a generally cylindrical shaped airship. For ease of description with respect to the present invention, only generally elongated ellipsoidal or cigar shaped airships will be discussed. Airship 10 has a load-bearing outer envelope 12 defining a hull 14 to which can be attached a gondola 16. Gondola 16 can carry passengers or a payload, such as, for example, electromagnetic interface apparatus, communications equipment, surveillance equipment, radars, spectral imaging, etc. Alternatively, the gondola 16 may be positioned within the interior of the hull 14 (not shown).

Figure 1B:
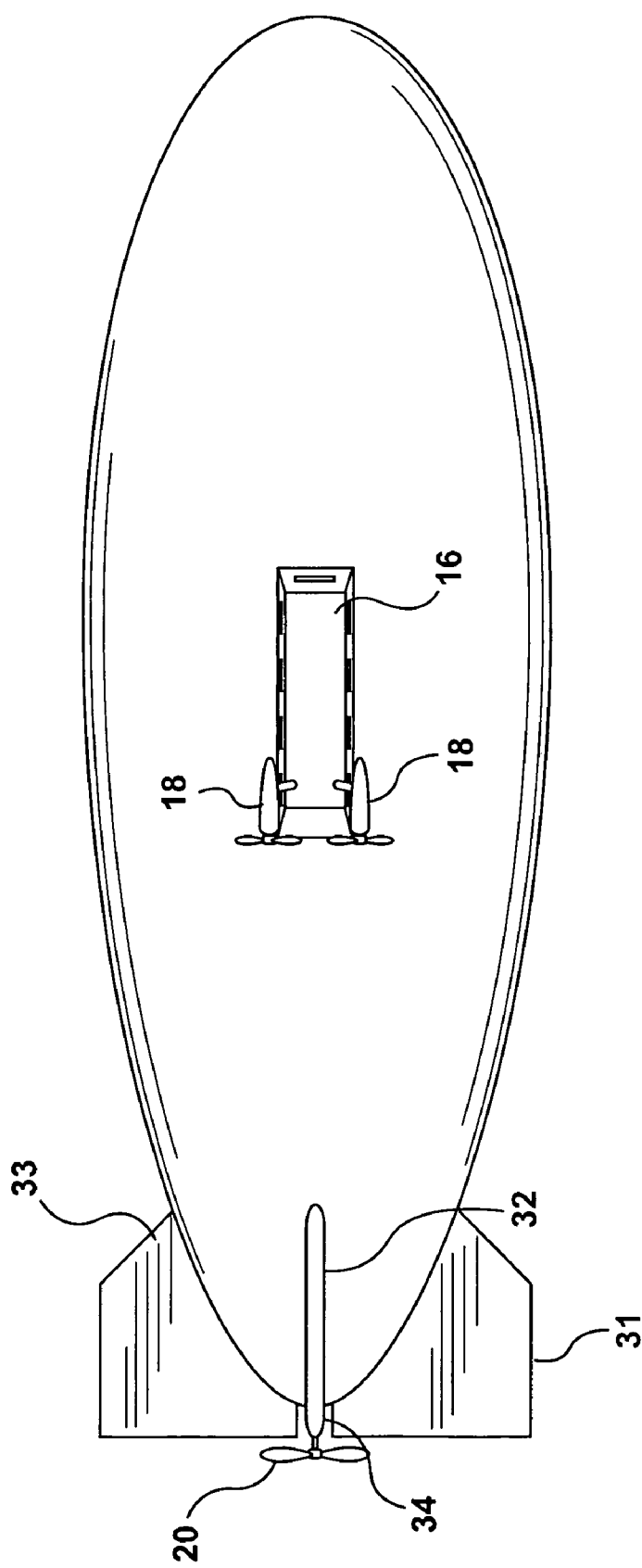

In operation, the outer envelope 12 has a generally circular cross-section, as shown in FIG. 1(b). The load-bearing outer envelope 12 is typically made from an air tight material and formed from panels that are joined together so as to be air impermeable, such as by heat welding or sewing. An airlock 15 is provided in outer envelope 12 to allow the introduction of components into the hull 14. Propulsion and steering apparatus 18, 20 can be mounted on the outer envelope 12 or the gondola 16 in a manner known to those skilled in the art. The propulsion apparatus can include, for example, airscrew engines that provide vectored thrust for take-off and landing of the airship 10, in addition to propelling the airship through the air in horizontal flight once a desired altitude has been reached. Stability and steering are controlled by fins and rudders 30, 31, 32 and 33 mounted to the aft or rear of the aircraft. Elevators 34 in the form of moveable auxiliary airfoils are hinged to the trailing end of the fins 31 and 33 and may be used to affect the pitch of the airship 10. Steering and altitude controls can also be from deflected or vectored thrust.

Figure 2:
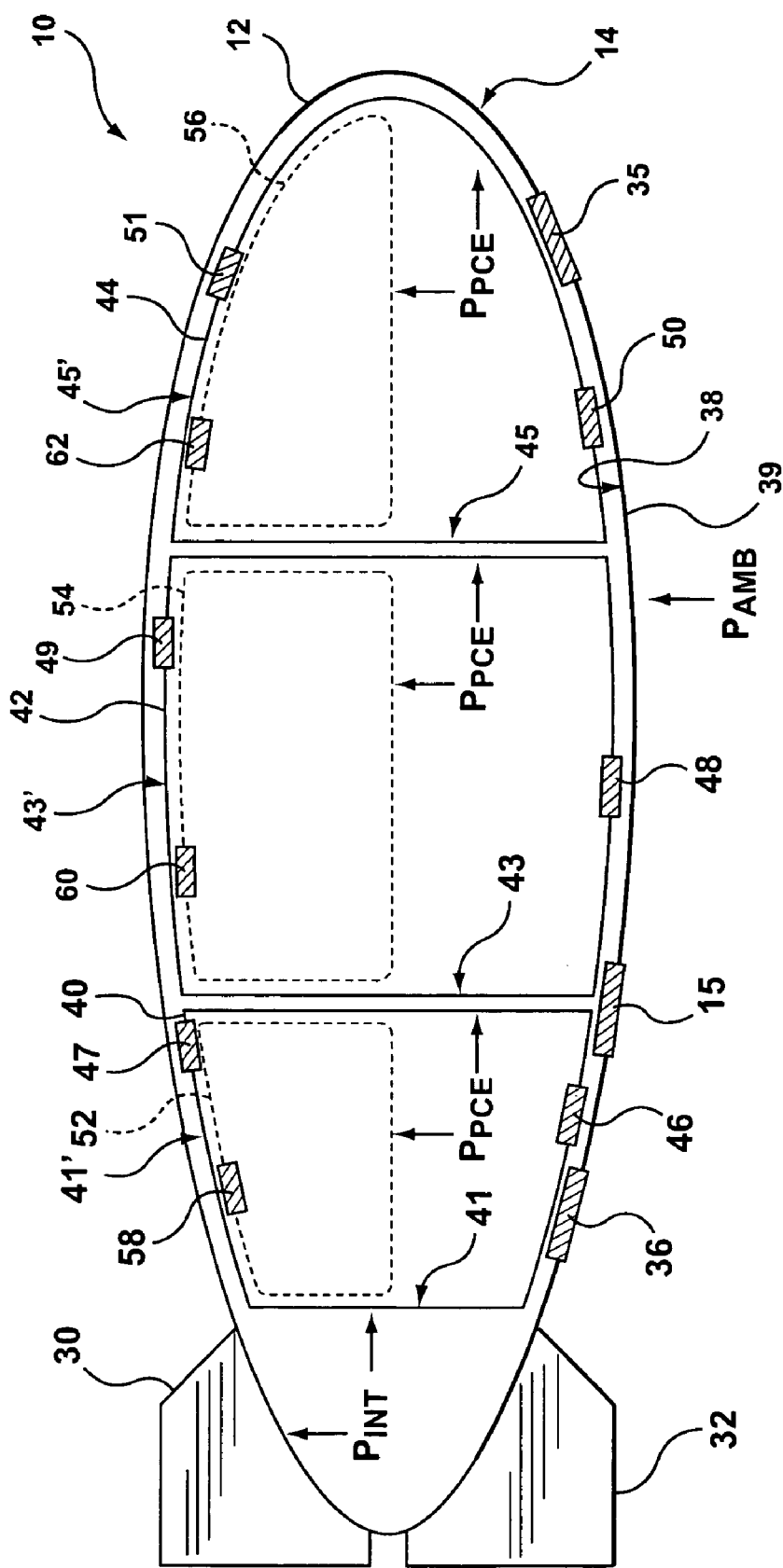
FIG. 2 is a cross sectional view of FIG. 1.

As shown in greater detail in FIG. 2, the shape of the airship 10 is maintained by the pressure exerted on the inner surface 38 of the outer envelope 12 by the contents of the hull 14. The internal pressure, $P_{INT}$, exerted on the inside surface 38 of the outer envelope 12 is maintained at a level that is greater than the ambient external atmospheric or barometric pressure, $P_{AMB}$, acting on the outer surface 39 of the outer envelope 12, so as to create a preferred relative pressure differential of approximately 1 inch of $H_2O$. As $P_{INT}$ is greater than $P_{AMB}$, thus establishing the relative pressure differential, the overall shape of the airship 12 can be maintained.

It will be understood, however, that the relative pressure differential between PAMB and $P_{INT}$ could vary depending on the environmental and operating conditions of the airship. For example, if there are high winds, the relative pressure differential may be higher so that the outer envelope 12 can withstand the higher wind speeds. A preferred range of the relative pressure differential between $F_{AMB}$ and $P_{INT}$ can be approximately 1 to 2 inches of $H_2O$, with a more preferred pressure differential of 1 inch of $H_2O$.

One or more electric fans or blowers, such as blower 35, can be adjacent the outer envelop 12 so as to be in and allow fluid communication with both the interior of hull 14 and the exterior environment. Blower 35 draws air from the exterior environment surrounding hull 14 and discharges air into the interior of hull 14, to maintain $P_{INT}$ greater than $P_{AMB}$, thus maintaining the relative pressure differential between $P_{INT}$ and $P_{AMB}$ so as to maintain the shape of the airship 10. Alternatively, blower 35 could be replaced with or act in combination with, an air-scoop (not shown) that could be mounted behind a propeller on a lower region of the outer envelop 12 so as to act in a similar fashion to that of blower 35. One or more pressure sensitive valves 36 communicates between the interior of the hull 14 and the external environment surrounding the outer envelope 12, to allow air to be released from the interior of the hull 14. Valve 36 is preferably an "over pressure" valve, in that its function is to relieve the internal pressure at a predetermined setting. In this way, over-pressurization of the envelope 12 and hull 14, such as, for example, during steep ascents, may be avoided.

It will be understood that one or more of blower 35 and/or pressure sensitive value 36 co-operate to maintain the relative pressure differential between $P_{INT}$ and $P_{AMB}$ within the predetermined range, such as those noted above, so as to maintain the shape of the airship 10 during operation.

As shown in FIGS. 1 and 2, there are also provided one or more pressure chamber envelops mounted within the hull 14. In FIGS. 1 and 2, there is provided three pressure chamber envelopes 40, 42 and 44 distributed within the interior of hull 14. Contained within pressure chamber envelopes 40, 42 and 44, there are provided three internal gas envelopes 52, 54 and 56. In operation, the lower part of each of the pressure chamber envelopes 40, 42 and 44 are filled with pressurized air and the internal gas envelopes 52, 54 and 56 can expand and contract within the pressure chamber envelope envelopes, in effect creating "reversed ballonets". It will be understood by those skilled in the art that the configuration shown in FIGS. 1 and 2 is a preferred embodiment and that any configuration of pressure chamber envelopes and gas envelopes that could accomplish the function set out herein is encompassed by the present invention. The function of the pressure chamber envelops envelopes and the gas envelopes will be discussed in greater detail below.

Figure 3:
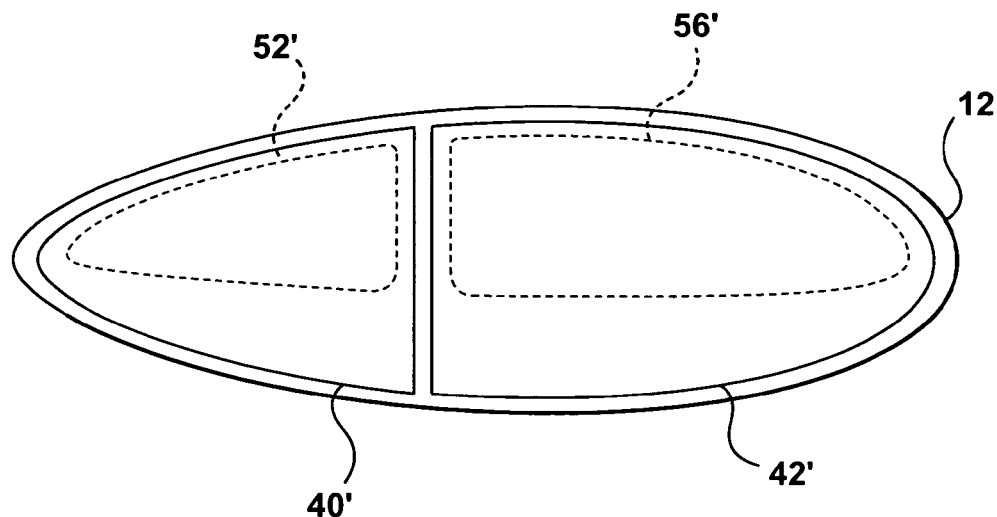
FIGS. 3 to 5 are cross sectional view of different embodiments of the present invention.
Figure 4:
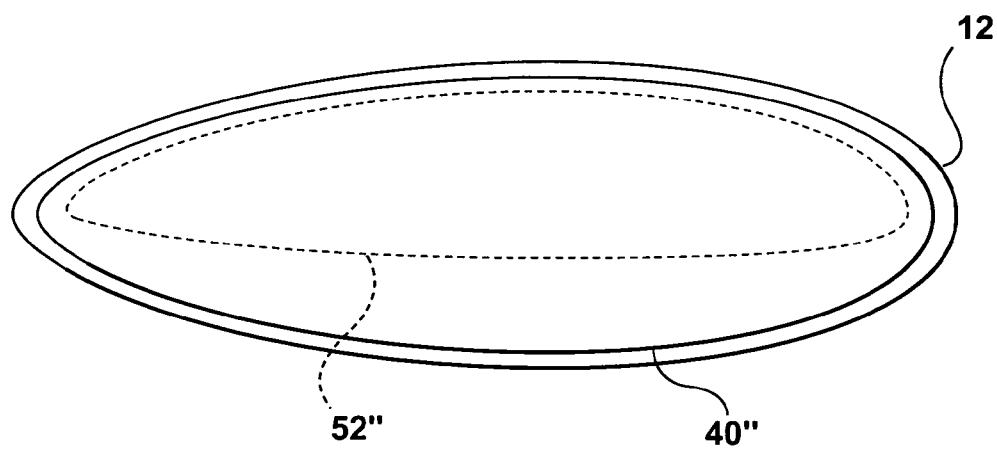
Figure 5:
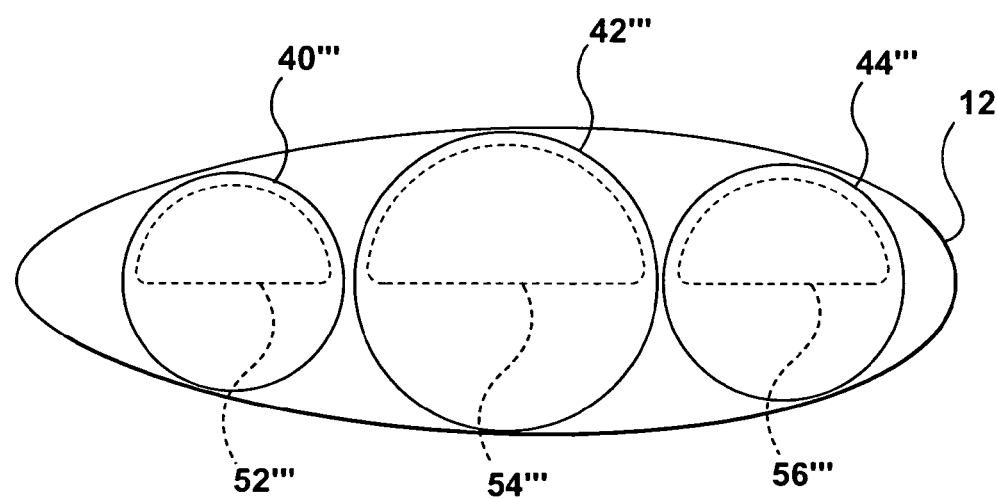

Examples of other preferred embodiments are provided in FIGS. 3 to 5. It will be understood that any number, size, shape and configuration of pressure chamber envelopes and internal gas envelopes are encompassed by the present invention such that when the pressure chamber envelopes have reached and are maintained at their maximum size, they are shaped and sized so that the movement of each of the pressure chamber envelopes within or throughout hull 14 of the airship 10 are significantly decreased or arrested; each pressure chamber envelope has reduced or preferably substantially reduced movement in relation to each other pressure chamber envelope. In one embodiment, as shown in FIG. 3, there is provided two pressure chamber envelops envelopes having two internal gas envelopes. As shown in FIG. 4, there is provided one pressure chamber envelope having one internal gas envelope. As shown in FIG. 2, envelopes 40, 42 and 44 are generally conoid or conical in shape. The pressure chamber envelopes could also vary in shape from the generally conical or conoid shape provided in FIGS. 1 and 2. As seen in FIG. 5, the pressure chamber envelopes could also be generally spherical and need not be of equal diameter. It will also be understood that the pressure chamber envelopes could also be generally cylindrical in shape. All of the preferred embodiments shown are provided with a gas envelope in each pressure chamber envelope. In other words, there is a ratio of 1:1 for pressure chamber envelopes and gas envelops envelopes.

The pressure chamber envelope envelopes can be either fixed in position within the hull 14, or more preferably, the pressure chamber envelopes of the present invention are sized and shaped such that when the envelopes are inflated to there desired size, each pressure chamber envelope will arrest the movement of the other pressure chamber envelopes within the hull 14. In other words, the pressure chamber envelopes 40, 42 and 44 are encouraged to maintain a relatively fixed position within the hull 14 by friction between the inner envelopes and the outer envelope 12. The inner envelopes may be further secured in position by non-rigid bulkheads (not shown) suspended from the inside surface 38 of the outer envelope 12. The bulkheads, for example, may be formed from fabric or some other non-rigid material attached to an upper portion of the inside surface 38 of the outer envelope 12 to extend down towards a lower portion of the inside surface 38 of the outer envelope 12.

The inflation of pressure chamber envelopes 40, 42 and 44 within hull 14 is maintained by the pressure exerted on the interior surface 41, 43 and 45 of pressure chamber envelopes 40, 42 and 44 of the air contained within the volume of each of the pressure chamber envelopes. The internal pressure, $P_{PCE}$, exerted on the inside surfaces of each of the pressure chamber envelopes is maintained at a level that is higher than the internal pressure, $P_{INT}$, acting on the inner surface 38 of the envelope 12 and the outer surfaces of the pressure chamber envelopes. By maintaining $P_{PCE}$, higher than $P_{ENT}$, the inflated shape of chambers 40, 42 and 44 is maintained. Similar to the relative pressure differential between $P_{INT}$ and $P_{AMB}$ as noted above, the internal pressure of the pressure chamber envelopes, $P_{PCE}$, exerted on the inside surface of each of the pressure chamber envelopes 40, 42 and 44 is maintained at a level that is greater than the internal pressure, $P_{INT}$, acting on the outer surfaces 41", 43" and 45" of the pressure chamber envelopes 40, 42 and 44, so as to create a preferred relative pressure differential of approximately 1 inch of $H_2O$. As $P_{PCE}$ is greater than $P_{INT}$, the overall shape of the pressure chamber envelopes can be maintained.

It will be understood, however, that the relative pressure differential between $P_{PCE}$ and $P_{INT}$ could vary depending on the environmental and operating conditions of the airship, since it will depend on the relative pressure differential between $P_{RNT}$ and $P_{AMB}$. For example, if there are high winds, the relative pressure differential may be higher due to the higher pressure differential between $P_{INT}$ and $P_{AMB}$ so that the outer envelop 12 can withstand the higher wind speeds. A preferred range of the relative pressure differential between $P_{PCE}$ and $P_{INT}$ can be approximately 1 to 2 inches of $H_2O$, with a more preferred pressure differential of 1 inch of $H_2O$.

At least one fan or blower is provided for each pressure chamber envelope. Blowers 46, 48 and 50, for example, can be mounted on each pressure chamber envelope, preferably on a lower region of each pressure chamber envelope, in fluid communication with the interior of the pressure chamber envelope so as to draw air from the within hull 14 and discharge air into the interior volume of the relevant pressure chamber envelope so as to maintain each pressure chamber envelope inflated within hull 14. One or more pressure sensitive valves 47, 49 and 51, preferably "over pressure" valves, communicate between the interior of each of the pressure chamber envelops envelopes and the interior of hull 14 surrounding each of the pressure chamber envelops envelopes, to allow air to be released from the interior of each of the pressure chamber envelope. In this way, over-pressurization of the envelopes 40, 42 and 44 may be avoided.

It will be understood that blowers 46, 48 and 50 and pressure sensitive values 47, 49 and 51 co-operate to maintain the relative pressure differential between $P_{PCE}$ and $P_{INT}$ within the range acceptable to the present invention as noted above so as to maintain the shape of the pressure chamber envelops envelopes within the outer envelope of the airship.

As noted above, there are contained within pressure chamber envelops envelopes 40, 42 and 44, three internal gas envelopes 52, 54 and 56. Traditional ballonets are compartments within the hull of an airship into which air can be blown or released to counteract changes of volume of the light-than-air or lifting gases contained within the hull. Traditionally, ballonets have been filled with air and not with buoyancy or lifting gas. The lower part of the pressure chamber envelopes, below the gas envelopes, is pressurized air and the gas envelopes can expand and contract within the pressure chamber envelopes, in effect creating "reversed ballonets".

The internal gas envelopes 52, 54 and 56 are inflated with a lighter-than-air or lifting gas to a certain percentage of their maximum volume and are thus free to expand or contact within the pressure envelope during ascent and descend of the airship. The amount of lifting gas necessary can be determined by known means, such as those recited in U.S. Pat. No. 5,294,076 as well as U.S. patent application Ser. Nos. 10/178, 345 and 10/718,634, the contents of which are hereby incorporated by reference.

In traditional soft-shell airships, the lighter-than-air or lifting gas is free to move about within the hull. In contrast, it can be seen, particularly with respect to FIG. 2, that the lifting gas for airship 10 is contained within at least one gas-tight gas envelope, which is in turn contained within at least one pressure chamber envelope located within the interior volume of the hull of the airship. In the preferred embodiment provided in FIGS. 1 and 2, gas envelope 52, 54 and 56 are contained within separate pressure chamber envelopes. In the embodiment shown in FIG. 1, there are three pressure chamber envelops envelopes, namely, 40, 42 and 44, having three gas envelops envelopes 52, 54 and 56. Other embodiments having one, two, four, five, six or more pressure chamber/gas envelope pairs are also contemplated. The operation of the embodiments provided in FIGS. 1 and 2 will be discussed in greater detail below, but it will be understood that the same discussion applies to other embodiments, such as, for example, those embodiments outlined in FIGS. 3 to 5.

The fluid (e.g. air) contained within the each of the pressure chamber envelopes exert pressure, $P_{PCE}$, on the inside surfaces 41, 43 and 45 of the pressure chamber envelopes 40, 42 and 44 to maintain the shape of each of the envelopes. The pressure exerted on the inside surfaces 41, 43 and 45 of the pressure chamber envelops envelopes 40, 42 and 44 can be controlled by adjusting the volume of fluid (i.e. air) contained within each of the pressure chamber envelopes. The gas envelopes 52, 54 and 56, when filled with the desired amount of lifting gas, take up a percentage of the interior volume of the pressure chamber envelops envelopes 40, 42 and 44. Each of gas envelopes 52, 54 and 56 is of sufficient size to accommodate the expansion of the lifting gas contained therein that will occur as the airship 10 ascends to the desired altitude. As a result of this expansion of the lifting gas in gas envelopes 52, 54 and 56, the volume, $V_{GE}$, of each gas envelope increases and each of the gas envelones expands inside each corresponding pressure chamber envelop envelope (see FIGS. 6 and 7).

As noted herein, the gas envelops envelopes can have a fully expanded volume that can be approximately 19 times as great as the volume for providing buoyancy at sea level. The internal free volume ($V_{INT}$) of pressure chamber eenvelopes should be large enough, therefore, to allow for the full expansion of the internal gas envelops envelopes. It will be understood that the use of the term "internal free volume", such as, for example, the internal free volume ($V_{INT}$) of the pressure chamber envelopes, refers to only the volume into which a gas envelope can expand during normal service operation up to the service ceiling. In other words, the $V_{INT}$ of the pressure chamber envelope refers to that portion of the total volume ($V_{TOT}$) of the pressure chamber envelope into which the gas envelopes can expand, namely the $V_{TOT}$ of the pressure chamber envelope minus the volume of the gas envelope ($V_{GE}$) contained therein. It will also be understood, therefore, that ascension of the airship, the $V_{INT}$ of each pressure chamber envelope will decrease as the $V_{GE}$ of the gas envelope increases due to expansion of the lifting gas, while the $V_{TOT}$ of the pressure chamber envelope will remain generally constant over time; the converse or reverse will be true during descent.

While unnecessary bleeding of lifting gas is generally considered undesirable, in the event that the buoyancy of each of the internal gas envelopes becomes excessive, a dump valve in the nature of reverse valves 58, 60, 62 is provided to permit dumping of lifting gas.

As a result of the decreased $P_{AMB}$ during ascent of the airship 10, the volume of the lifting gas contained in gas envelooes 52, 54 and 56, $V_{GE}$, will increase. As the volume of each gas envelope increases, the internal free volume, namely the volume allocated for allowing expansion of the gas envelopes, of each of the pressure chamber envelopes will decrease. The resulting decrease in the internal free volume of the pressure chamber envelope will result in an increased $P_{PCE}$. In order to maintain the relative pressure differential between $P_{PCE}$ and $P_{INT}$, air could, for example, be released from pressure sensitive valves 47, 49 and 51. Thus, as the lifting gas contained within gas envelopes 52, 54 and 56 expands due to reduced external atmospheric or barometric pressure (i.e. $P_{AMB}$), or through other environmental conditions (e.g. increased solar heating), the fluid pressure within the interior of the pressure chamber envelopes, $P_{PCE}$, can be reduced through reducing the operation of the blowers 46, 48 and 50 and/or releasing air through valves 47, 49 and 51. In this way, the pressure exerted on the inside surfaces 41, 43 and 45 of the envelopes 40, 42 and 44 can be appropriately adjusted to maintain the shape of the envelopes and maintain the relative pressure differential between $P_{PCE}$ and $P_{INT}$.

It will be understood that during descent, the process noted above can be reversed in order to accommodate the contraction of the lifting gas contained within the gas envelopes and the increasing internal free volume contained within the pressure chamber envelopes. In other words, $V_{GE}$ will decrease as the lifting gas contracts during descend of the airships resulting in the contraction of the gas contained within the pressure chamber envelopes. The pressure differential between $P_{PCE}$ and $P_{INT}$ will, however, remain constant as air is taken into pressure chamber envelopes by increasing the operation of the blowers 46, 48 and 50.

At least a portion of the envelopes 40, 42, and 44, together with air contained in the internal free volume of hull 14 exert pressure on the inside surface 38 of outer envelope 12 to maintain the shape of airship 10. In turn, the pressure exerted on the inside surface 38 of outer envelop-envelope 12 can be controlled by adjusting the volume of air contained within hull 14 through blower 35 and/or vent 36. Given that the expansion and/or contraction of the lifting gas is accommodated with the pressure chamber envelopes, the $P_{RNT}$ is not expected to vary due to the expansion or contraction of the lifting gas. However, as $P_{AMB}$ changes, it may be necessary to vary $P_{INT}$ so as to maintain the pressure within the interior or internal volume of the airship 10 at a slightly elevated pressure when compared to $P_{AMB}$, and thus maintain the shape of the airship. The automatic blower/s and valves should maintain the preferred differential pressure of approximately 1 inch of $H_2O$ at all times.

In a preferred embodiment, the service ceiling is between approximately 60,000 feet and approximately 70,000 feet (between approximately 18 and approximately 21 Km), depending on the desired activity of the airship. At this service ceiling, a lifting gas expansion of between approximately 10 and approximately 17 times the volume at sea level would be expected. In the case of an airship ascending from sea level to an altitude of approximately 70,000 ft (approximately 21 Km), the lifting gas contained within the gas envelopes can expect to expand approximately 17 times its volume at sea level. Accordingly, in the present invention, a gas envelope may be filled to only as little as $1/19$ of its total volume at sea level. During the climb to the selected altitude, the lifting gas may expand as noted above, eventually occupying approximately $17/19^{th}$ of the total volume of the pressure chamber envelops envelopes. At the designed operational altitude, the pressure chamber envelopes are intended to still have enough space to expand with temperature increases during daytime sun exposure.

With conventional cigar shaped airships, fore and aft air filled ballonets (i.e. filled with air; not filled with lifting gas) can be employed that can be inflated, or deflated, as the lighter-than-air or lifting gas or envelops envelopes containing the lighter-than-air or lifting gas expand or contract with changes in environmental conditions (e.g. altitude, temperature, etc.). The ballonet operation between mean sea level (where ambient pressure is about 1013 MB) and 5,000 ft (where ambient pressure is about 843 MB) may involve ballonets of approximately 20% of the volume of the aircraft. To reach, for example, a service ceiling of about approximately 60,000 ft (where the ambient pressure is about 71 MB), however, the volume of the lifting gas used at lift-Off from sea level may be as little as approximately $1/10$ of the volume of the lifting gas at 60,000 ft. This can create instability within the hull of a traditional or conventional cigar shaped airship, which can translate into significant control challenges at low altitude. Differential inflation of the air filled ballonets within the airship can be used to adjust airship trim. However, the low volume of the lifting gas can result in instability in the placement of the ballonets therein, leading to pitching, rolling and yawing.

The airship of the present invention increases the stability of an airship as the airship of the present invention tends not to have balancing problems at any stage of "fullness". Unlike previous airships, the presence of the gas envelopes within the pressure chamber envelopes as in the present invention provides for a much more stable airship.

Preferably, the gas envelopes 52, 54 and 56 together provide neutral buoyancy (a buoyant force at least as great as the weight of the airship) to the airship 10 when filled to only 6% of the total volume of the hull 14 at mean sea level at 15°C. Gas envelopes 52, 52 and 56 are thus sized to together accommodate a volume of lifting gas that is up to 19 times as great as the volume of lifting gas required to provide neutral buoyancy at mean sea level on a 15°C. day.

An aspect of the present invention is to provide for a high altitude airship. An aspect of the invention also includes an airship with improved stability at lower altitudes (approximately mean sea level to approximately 5,000 ft. (approximately 1.5 Km) and is capable of aerobatic flight. As provided in FIG. 8, there is provided a further embodiment. Airship 110 is adapted for aerobatic flight and not for high altitude flight. Aerobatic flight will generally be understood to refer to the ability of the airship to perform manoeuvres such as flying generally perpendicular to the horizontal, inverted flight or performing inverted loops in which the nose of the airship travels through 360.degree., etc. While airship 110 is generally elongated ellipsoidal or cigar shaped, it will be understood that non-spherical variations of this shape would be understood to work with the present invention, such as, for example, a generally egg shape or a generally cylindrical shaped airship. For ease of description with respect to the present invention, only generally elongated ellipsoidal or cigar shaped airships will be discussed. Airship 110 has a load-bearing outer envelope 112 defining a hull 114 to which can be attached a gondola (not shown), such as gondola 16 as provided in FIGS. 1(a) and 1(b). The load-bearing envelope 112 is similar in configuration to the load-bearing envelope 12 noted above (not shown). Propulsion and steering apparatus can also mounted on the outer envelope as noted above (not shown). Except for the differences noted below, and unless indicated otherwise, it will be understood that the elements of airship 110 are the same as airship 10 noted above.

Figure 8:
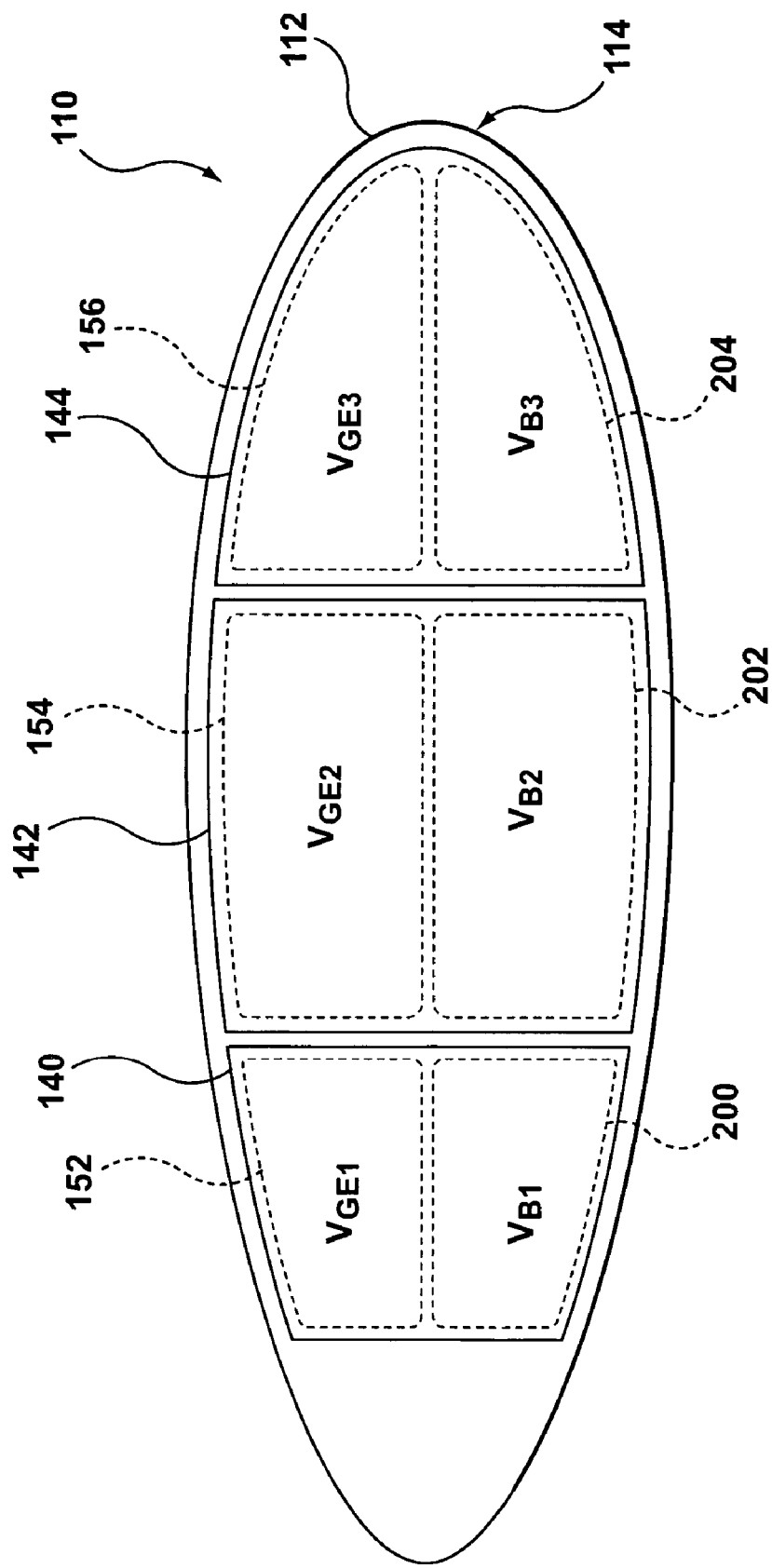
FIG. 8 is a cross sectional view of an embodiment of the present invention.

In FIG. 8, there is provided three pressure chamber envelopes 140, 142 and 144 distributed within the interior of hull 114. Contained within pressure chamber envelopes 140, 142 and 144, there are provided three internal gas envelopes 152, 154 and 156 contained within the upper portion of envelopes 140, 142 and 144. In addition, there is provide three air filled envelopes 200, 202 and 204 contained within the lower portion of pressure chamber envelopes 140,142 and 144. In operation, air filled envelopes 200, 202 and 204 are filled with slightly pressurized air through blowers that are designed to provide a specific pressure and through valves that open when the pressure exceeds a predetermined limit (similar to the air as regulated in the pressure chamber envelopes 40, 42 and 44 in FIGS. 2 and 3). It will be understood by those skilled in the art that the configuration shown in FIG. 8 is a preferred embodiment and that any configuration of pressure chamber envelopes, gas envelopes and air filled envelopes that could accomplish the function set out herein is encompassed by the present invention.

The air filled envelopes 200, 202 and 204 can be either fixed in position within the pressure chamber envelopes 140, 142 and 144, or more preferably, are sized and shaped such that during operation, envelopes 200, 202 and 204 will arrest the movement of the gas filled envelopes 152, 154 and 156. As noted above, the internal gas envelopes 152, 154 and 156 are maximally inflated with a lighter-than-air or lifting gas determined for a particular load and altitude. It will be understood that as airship 110 is designed to flight within a very narrow altitude range, it is not necessary for internal gas envelopes 152, 154 and 156 to expand or contract significantly within the pressure envelope.

The gas envelopes 152, 154 and 156, when filled with the desired amount of lifting gas, take up a percentage of the internal free volume of the pressure chamber envelopes 140, 142 and 144. Envelopes 200, 202 and 204 will arrest the movement of the gas filled envelopes 152, 154 and 156 as the volume of the air filled envelopes 200, 202 and 204, namely $V_{B1}, V_{B2}, V_{B3}$, will encompasses the remaining internal free volume (i.e. the volume not occupied by the gas filled envelops envelopes) of the corresponding pressure chamber envelops envelopes 140, 142 and 144.

Operation

During operation of airship 10, the outer envelope 12 is inflated with air to a predetermined pressure generally over PAMB at sea level, using blower 40. As noted above, the external atmospheric or barometric pressure $P_{AMB}$ will be less than $P_{INT}$, in order to maintain the shape of the airship 10. As such, there will be a preferred range of relative pressure differential between the external pressure PAMS and the internal pressure $P_{INT}$ of approximately 1 to 2 inches of $H_2O$, more preferably 1 inch of $H_2O$. It will be understood, however, that the relative pressure differential between $P_{AMB}$ and $P_{INT}$ could vary depending on the environmental and operating conditions of the airship. For example, if there are high winds, the relative pressure differential may be higher so that the outer envelope 12 can withstand the higher wind speeds.

The pressure chamber envelops envelopes having the lifting gas envelopes 52, 54 and 56 contained therein may be inserted into the hull 14 through airlock 15 in an non-inflated condition. Subsequently, the pressure chamber envelopes are inflated with air using blowers 46, 48 and 50 such that a preferred relative pressure differential is created between $P_{INT}$ and $P_{PCE}$ of approximately 1 inch of $H_2O$. As $P_{PCE}$ is greater than $P_{INT}$, the overall shape of the pressure chamber envelops envelopes can be maintained. It will be understood, however, that the relative pressure differential between $P_{PCE}$ and $P_{INT}$ could vary depending on the environmental and operating conditions of the airship, since it will depend on the relative pressure differential as between $P_{INT}$ and $P_{AMB}$. For example, if there are high winds, the relative pressure differential may be higher so that the outer envelop 12 can withstand the higher wind speeds. A preferred range of the relative pressure differential between $P_{PCE}$ and $P_{INT}$ can be approximately 1 to 2 inches of $H_2O$, more preferably 1 inch of $H_2O$.

Prior to insertion into the airship, gas envelopes 52, 54 and 56 can be partially filled with lifting gas and inserted into pressure chamber envelopes 40, 42 and 44. The envelopes 40, 42 and 44 will be sufficiently buoyant to be floated into position against the inside surface 38 of the outer envelope 12. Alternatively, the gas envelopes can be filled following insertion into the pressure chamber envelope. Once properly positioned inflation of the gas envelopes 52, 54 and 56 to the desired amount of lifting gas is completed. The volume of lifting gas used to inflate the gas envelopes 52, 54 and 56 is determined according to the application of the airship, particularly the intended payload thereof. As noted above, at a service ceiling of between approximately 60,000 ft to approximately 70,000 ft, the lifting gas can be expected to expand to up to approximately 18 times the volume at sea level. To allow for additional expansion due to solar heating, the total volume of lifting gas used to inflate the gas envelopes should be no greater than 6% of the total volume of the pressure chamber envelopes at sea level for an intended service ceiling of approximately 60,000 ft to approximately 65,000 ft. Most commonly, the lifting gas will be helium, but other lifting gases such as hydrogen may also be used. The bulkheads (not shown), if present, may assist in maintaining the pressure chamber envelopes 40, 42 and 44 in position during steep ascents or descents.

Once the gas envelopes 52, 54 and 56 are filled with the final amount of lifting gas and are in position, the airship 10 may be prepared for takeoff.

Figure 7:
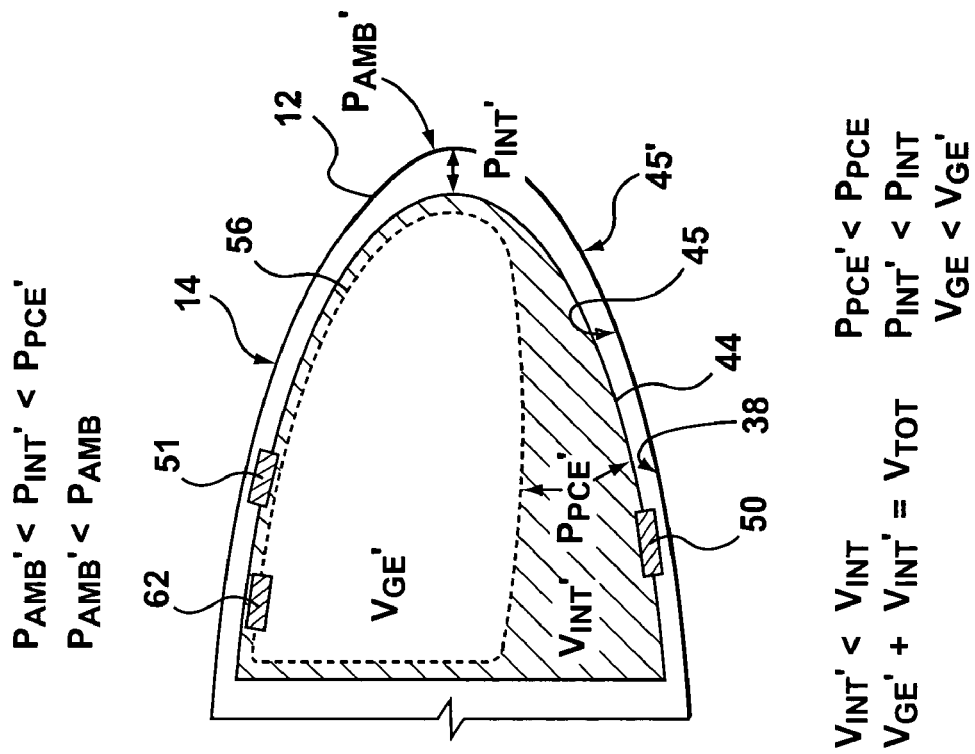
FIGS. 6 and 7 are an exploded view of the front portion of an airship in accordance with the present invention.
Figure 6:
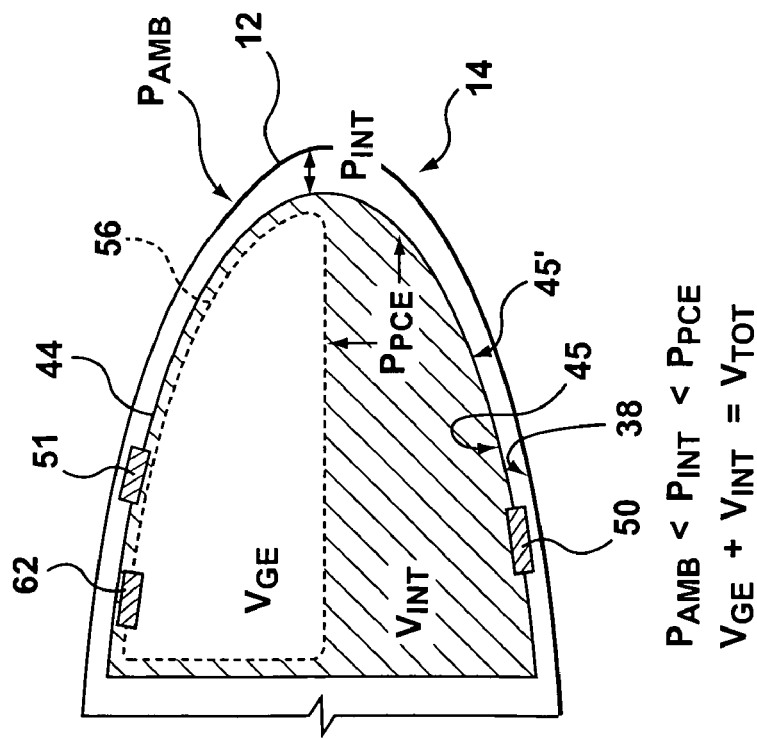

FIGS. 6 and 7 provide an example of the sequence of events during ascension of the airship 10 towards the service ceiling. FIGS. 6 and 7 provide an exploded view of the forward portion of airship 10, showing the forward portion of hull 14, pressure chamber envelope 44, and gas envelope 56. It will be understood that the process outlined in FIGS. 6 and 7 for the forward portion of the aircraft will also be occurring for those portions of the aircraft not shown. FIG. 6 provides airship 10 at sea level, while FIG. 7 provides airship 10 at an elevated altitude. As an overview, the lifting gas expands due to decreased ambient pressure about the outer surface 39 of the outer envelope 12 of airship 10. As airship 10 ascends, $P_{AMB}$ will decrease to $P'_{AMB}$. As a result, $P_{INT}$ will decrease to $P'_{INT}$ so as to maintain the relative pressure differential between $P_{AMB}$ and $P_{INT}$; the relative pressure differential will be the same as between $P_{ANB}$ and $P_{INT}$ and between $P'_{AMB}$ and $P'_{INT}$. As a result of the decrease in $P'_{INT}$, the internal pressure, $P_{PCE}$, of the pressure chamber envelope 44 will decrease to $P'_{PCE}$ so as to maintain the relative pressure differential between $P_{INT}$ and $P_{PCE}$; the relative pressure differential will be the same as between $P_{INT}$ and $P_{PCE}$ and between $P'_{INT}$ and $P'_{PCE}$. Due to the decrease of $P_{PCE}$, which corresponds to a decrease in the barometric pressure outside of the airship, the volume of the lifting gas contained in gas envelope 56 will increase from $V_{GE}$ to $V'_{GE}$. As noted above, the resulting decrease in the internal free volume, $V_{INT}$ of the pressure chamber envelope 44 will result in an increase to $P_{PCE}$. In order to maintain the relative pressure differential between $P_{INT}$ and $P_{PCE}$, air could, for example, be released from pressure sensitive valve 51. Thus, as the lifting gas contained within gas envelope 56 expands due to reduced external atmospheric or barometric pressure (i.e. $P_{AMB}$), or through other environmental conditions (e.g. increased solar heating), the fluid pressure within the interior of the pressure chamber envelops envelopes, $P_{PCE}$, can be reduced through reducing the operation of the blower 50 and/or releasing air through valve 51. In this way, the pressure exerted on the inside surfaces 45 of the envelope 46 can be appropriately adjusted to maintain the shape of the envelopes and maintain the relative pressure differential between $P_{INT}$ and $P_{PCE}$.

As airship 10 ascends, the $V_{INT}$ of each pressure chamber envelope will decrease to $V_{RNT}$ as the $V_{GE}$ of the gas envelope increases to $V'_{GE}$ due to expansion of the lifting gas contained therein. The $V_{TOT}$ of each of the pressure chamber envelopes will, however, remain generally constant during ascension.

In traditional airships, wherein the lifting gas is free to move about within the interior of the hull, the motion of the airship at low altitudes lends to cause the lifting gas to move about within the hull, altering the attitude (i.e. pitch, yaw, rotation) of the airship 10 and causing destabilization. In contrast, the gas envelopes 52, 54 and 56 of airship 10 each contain only a small volume (e.g. 2% of the volume of the pressure chamber envelopes in the embodiment of FIG. 1) of lifting gas confined within the gas envelopes which are in turn confined in each of the pressure chamber envelopes 40, 42, 44. Accordingly, the lifting gas is not free to move from one end of the airship 10 to the other, but only within the pressure chamber envelopes. Furthermore, the gas envelopes 52, 54 and 56 are maintained within each pressure chamber envelope 40, 42, 44, which are, in turn, maintained in a specific position within the hull 14, thus further minimizing the shifting of lifting gas about the hull 14. Accordingly, the normal shifting of lifting gas within the interior of the outer envelope 12 that causes destabilization at low altitudes is avoided, thus permitting the airship 10 to travel relatively smoothly to the desired altitude.

During descent of airship 10, which can be initiated by pitching the nose of the airship downwards and applying power from the engines/propellers or by vectored thrust, the lifting gas within gas envelopes 52, 54 and 56 contract as altitude decreases. To compensate for the accompanying reduction in volume of the gas envelops envelopes from $V_{GE}$ to $V'_{GE}$, as shown in FIGS. 6 and 7,: air is pumped into the interior of the pressure chamber envelope 46 by blower 50, to maintain the pressure differential between $P_{INT}$ and $P_{PCE}$. It will be understood that during this, air is also pumped into outer envelope 12.

An aspect of the invention also includes an airship with improved stability at lower altitudes (approximately mean sea level to approximately 5,000 ft. and is capable of acrobatic flight. As provided in FIG. 8, there is provided airship 110. As noted above, the gas envelopes 152, 154 and 156, when filled with the desired amount of lifting gas, take up a percentage of the volume of the pressure chamber envelopes 140, 142 and 144. Envelopes 200, 202 and 204 will arrest the movement of the gas filled envelopes 152, 154 and 156 as the volume of the air filled envelopes 200, 202 and 204, namely $V_{B1}$, $V_{B2}$, $V_{B3}$, will encompasses the remaining internal free volume (i.e. the volume not occupied by the gas filled envelops) of the corresponding pressure chamber envelopes 140, 142 and 144.

As envelopes 200, 202 and 204 will arrest the movement of the gas filled envelopes 152,154 and 156, airship 110 is capable of conducting aerobatic manoeuvres (such as flying generally perpendicular to the horizontal, inverted flight or performing inverted loops in which the nose of the airship travels through 3600, etc. Airship 110 is capable of conducting such manoeuvres because the gas filled envelopes 152, 154 and 156 are held in position by the envelopes 200, 202 and 204. Without envelopes 200, 202 and 204, the gas filled envelopes 152,154 and 156 would be capable of moving within the pressure chamber envelopes, thus causing instability of the airship, particularly during aerobatic manoeuvres. With such movement arrested, the airship is capable of performing various aerobatic manoeuvres.

Various embodiments of the invention have now been described in detail. Since changes in and/or additions to the above-described best mode may be made without departing from the nature, spirit or scope of the invention, the invention is not to be limited to those details but only by the appended claims.

I claim:

1. A method for operating an airship, the method comprising the steps of:

providing a non-rigid, non-spherical airship having a weight and an outer envelope defining a hull having a first volume, said airship having a propulsion system and a directional control system, said airship also having a second envelope contained within the first volume and the second envelope having a second volume; and a third envelope contained within the second volume and having a third volume for holding lifting gas; said third envelope being expandable within said second envelope to a maximum predetermined volume, inflating said second envelope with a gas having a density greater than said lifting gas; and partially inflating the third envelope with a mass of said lifting gas, thereby permitting the expansion and contraction of the third envelope within the second envelope as the lifting gas expands and contracts during operation, whilst maintaining said mass of said lifting gas within said third envelope during said expansion and contraction; wherein the volume occupied by the lifting gas is sufficient to balance said weight.

2. The method of claim 1 wherein the first envelope provides for fluid communication between the first volume and an exterior of the airship.

3. The method of claim 2 wherein the second envelope provides for fluid communication between the second volume and the first volume.

4. The method of claim 1 wherein a portion of the second volume not containing the third envelope decreases with the expansion of the lifting gas contained within the third envelope, and the sum of the portion of the second volume not containing the third envelope and the volume of the third envelope remains generally constant.

5. The method of claim 1 further comprising the step of operating said airship to a location greater than 10,000 ft above mean sea level.

6. The method of claim 1 wherein the volume occupied by the lifting gas at mean sea level is less than $1/19^{th}$ of said maximum predetermined volume of said third envelope.

* * * * *